United States Patent

Matsumi

[11] Patent Number: 5,121,274
[45] Date of Patent: Jun. 9, 1992

[54] MAGNETIC HEAD HAVING FE NI NB GAP LAYER

[75] Inventor: Yutaka Matsumi, Hanno, Japan

[73] Assignee: Canon Denshi Kabushiki Kaisha, Chichibu, Japan

[21] Appl. No.: 589,022

[22] Filed: Sep. 27, 1990

[30] Foreign Application Priority Data

Sep. 29, 1989 [JP] Japan ................................ 1-252267

[51] Int. Cl.$^5$ .......................... G11B 5/235; G11B 5/47
[52] U.S. Cl. ................................. 360/120; 360/126
[58] Field of Search ................ 360/119, 120, 125, 126

[56] References Cited

U.S. PATENT DOCUMENTS 5,001,590 3/1991 Saito .................................. 360/120

Primary Examiner—A. J. Heinz
Attorney, Agent, or Firm—Spencer, Frank & Schneider

[57] ABSTRACT

A magnetic head comprises a pair of core halves made of a magnetic oxide and being opposite to each other. An FeNiNb type alloy film is arranged on at least a portion of the respective opposite surfaces of the two core halves. A magnetic metal film is provided on respective surfaces of the alloy films. Furthermore, a magnetic gap portion is formed at least a portion of a space defined between the both magnetic metal films. Portions of the alloy films near the magnetic gap portion are arranged substantially parallel to the magnetic gap portion. The alloy films have a composition represented by a composition formula: $Fe_aNi_bNb_c$ wherein a, b and c are percentage compositions of respective components on percent (%) by weight basis, and satisfy the following relationships:

$$5 \leq a \leq 29,$$

$$70 \leq b \leq 85,$$

$$1 \leq c \leq 15,$$

and $$a+b+c=100$$

The thickness of the alloy films is in a range of from 0.05 to 2 μm.

9 Claims, 2 Drawing Sheets

# MAGNETIC HEAD HAVING FE NI NB GAP LAYER

BACKGROUND OF THE INVENTION

1. Field of the Invention

The present invention relates to a magnetic head and more particularly to a magnetic head which performs magnetic recording or reproduction of information to or from a magnetic recording medium by slidably contacting a magnetic core, around which a coil is wound, the magnetic recording medium.

2. Description of the Prior Art

In the field of magnetic recording, metal type magnetic recording medium have hitherto been used. The metal type magnetic recording medium has a high coercive force and a high residual magnetic flux density according as recording signals with higher densities. For this reason, it is required that a material for constructing a core of a magnetic head for performing magnetic recording or reproduction has a high saturated magnetic flux density and a high magnetic permeability.

However, a ferrite, which is a ferromagnetic oxide that has hitherto been used most widely as a core element, fails to give satisfactory characteristics. Therefore, in order to obviate this disadvantage, metal-in-gap type magnetic heads have recently been put in practice widely in place of conventional ferrite heads of which all the magnetic paths of their magnetic cores are made of a ferrite. The metal-in-gap type magnetic heads are composite heads each including a pair of magnetic core halves made of a ferrite that the magnetic core halves are opposite to each other through a magnetic gap element and whose surfaces are provided thereon with a magnetic metal film having a high saturated magnetic flux density and made of a metallic material, for example Sendust or amorphous alloy that is formed by a vacuum film formation technique such as sputtering vapor deposition, ion plating, or the like.

The metal-in-gap type magnetic heads of the above-described construction, however, are still disadvantageous in that because of heat treatment at a high temperature as high as, e.g., from about 500° to 600° C., in a step of weld of glass which is indispensable to a process for the fabrication of magnetic heads, a diffusion reaction occurs at an interface between the above-described ferromagnetic oxide and the magnetic metal film, thus forming a reaction prevention film having deteriorated soft magnetic characteristics. The reaction prevention film serves as a quasi-gap or false gap to give rise to a quasi-peak or false peak due to its interference with a magnetic flux of the true magnetic gap portion. As a result, swells are formed in a frequency characteristics curve of reproduced signals so that a so-called contour effect is produced. This problem has conventionally been coped with by making use of an azimuthal effect, more particularly by providing an azimuth angle so that a junction portion which would serve as a false gap and a magnetic gap portion are arranged non-parallel to each other. However, with the above-described construction, it is necessary to provide a thick magnetic metal film. For example, in case of fabricating a magnetic head for a still video camera, or VTR, i.e., video tape recorder which has a track whose width is in the range of from 10 to 60 μm, it is necessary to provide a magnetic metal film in thickness of 20 to 30 μm. When the thickness is not in the above-described range, it causes a problem that yield of products decreases because of peeling off of films or it takes a long time to form deposits, thus decreasing productivity.

SUMMARY OF THE INVENTION

An object of the present invention is to provide a magnetic head which exhibits good characteristics at the time of recording and reproduction of information without causing deterioration of reproduction characteristics even after heat treatment such as weld of glass.

Another object of the present invention is to provide a magnetic head which has a simple construction and can be fabricated at a lower cost.

In order to solve the above-described problems, the present invention provides a magnetic head comprising, a first core half and a second core half, respectively made of a magnetic oxide and having first and second opposite surfaces being opposite to each other, an FeNiNb type alloy film arranged on at least one of the first and second opposite surfaces of the first and second core halves, a first magnetic metal film and a second magnetic metal film arranged on the first and second opposite surfaces including the FeNiNb type alloy film which is arranged on at least one of the first and second opposite surfaces, a magnetic gap portion formed on at least a portion of a space defined between the first and second magnetic metal films, wherein a portion of the FeNiNb alloy film near the magnetic gap portion is substantially parallel to the magnetic gap portion.

The above-described first and second FeNiNb type alloy films each have a thickness in a range of from 0.05 to 2 μm, and preferably from 0.1 to 1 μm.

The above-described first and second core halves may be constructed by a ferromagnetic oxide such as Mn-Zn type ferrite while the first and second magnetic metal films may be constructed by an alloy which has soft magnetic characteristics such as Sendust type alloy.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereafter, an embodiment the present invention will be described in detail with reference to the attached drawings.

Figure 1:
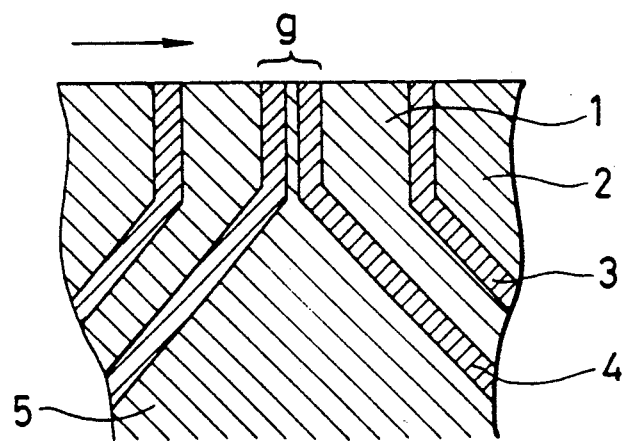
FIG. 1 is an enlarged view showing a construction around a magnetic gap portion of a magnetic core of a magnetic head according to one embodiment of the present invention.
Figure 2:
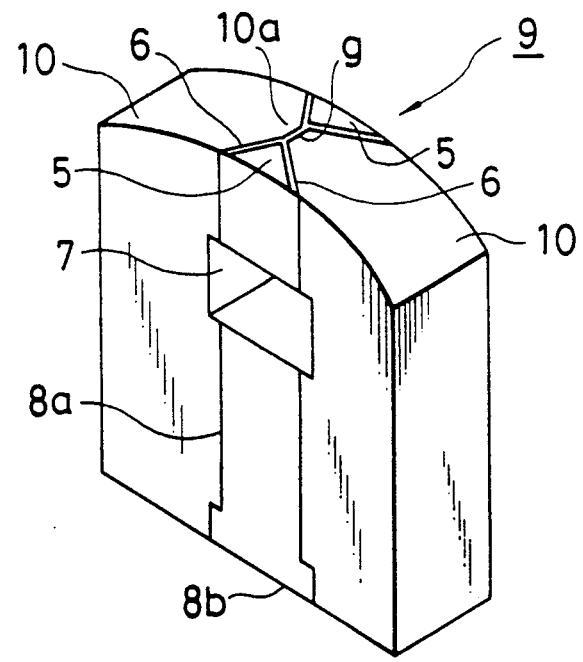
FIG. 2 is a perspective view showing overall appearance of the magnetic core shown in FIG. 1.

FIG. 1 is an enlarged plan view showing the construction around the magnetic gap portion of the magnetic head according to one embodiment of the present invention, and FIG. 2 is a perspective view illustrating the appearance of the same magnetic core as shown in FIG. 1.

In FIGS. 1 and 2, reference numeral 1 indicates a magnetic metal film, which serves as a main core element. In this embodiment, a Sendust type alloy is used as a soft magnetic alloy which is used for the fabrication of the magnetic metal film. Reference numeral 2 denotes an auxiliary core element made of a magnetic oxide. Also, an Mn-Zn type ferrite is used as a ferromagnetic oxide which is an example of the magnetic oxide. A reaction prevention film 3 is provided between the magnetic metal film 1 and the magnetic oxide 2. An FeNiNb type alloy film is used as the reaction prevention film 3. The reaction prevention film 3 has a thickness in a range of from 0.05 to 2 $\mu$m, and preferably from 0.1 to 1 $\mu$m. Reference numeral 4 denotes a magnetic gap element made of silicon dioxide. Reference numeral 5 is weld glass and symbol g indicates a magnetic gap portion between opposite surfaces of core halves 10, a pair of magnetic core halves. Furthermore, there are used two core halves 10 which are made of the magnetic oxide 2 and provided on their surfaces, respectively, with three layers, i.e., the reaction prevention film 3, the magnetic metal film 1, and the magnetic gap element 4, in this order. The two core halves 10 provided with the three layers are opposite to each other on their opposite surfaces through the layers 3, 1 and 4 and bonded with molten weld glass 5 to each other to thereby construct a magnetic core 9. Thus, the magnetic core 9 of the magnetic head according to this embodiment is essentially symmetrical in structure and includes two core halves, two allow films, two magnetic metal films and two magnetic gap elements. Silicon dioxide is used as the magnetic gap element 4 with which the magnetic gap portion g is formed. Track grooves 6 are formed on both end sides of the magnetic gap portion g on sliding surface 10a of the core halves 10. The track grooves 6 limit a track width of the magnetic gap portion g. The track width is identical to a width of a recording track which is defined by a magnetic gap. A coil groove 7 is formed in a mid portion of each of the opposite surfaces of the core halves 10. A coil winding (not shown) is wound around each of the coil grooves 7.

Glass grooves 8a and 8b are formed on both sides of the opposite surfaces of the core halves 10. The above-described magnetic core 9 is fabricated by filling weld glass 5 in the grooves 8a and 8b, by arranging a pair of the core halves 10 so that the two core halves are opposite to each other and by bonding the two core halves to each other through the magnetic gap element 4. The magnetic core 9 in the magnetic head according to this embodiment is constructed in a form of a metal-in-gap type as described above whose construction around the magnetic gap portion g is as shown in FIG. 1, in which an arrow indicates direction of slide movement of a magnetic recording medium.

On the opposite surfaces facing the magnetic gap portion g of the core halves 10 made of the magnetic oxide 2 are formed the magnetic metal film 1 which has a high saturated magnetic flux density.

A part of the reaction prevention film 3 which is present on an interface between the magnetic oxide 2 and the magnetic metal film 1 near the magnetic gap portion g is substantially parallel to the magnetic gap portion g.

Metal-in-gap type magnetic heads which are useful in still video cameras and VTR can be fabricated by slicing a precursor of the magnetic core 9 prepared into a plurality of separate head chips as described above.

Figure 3:
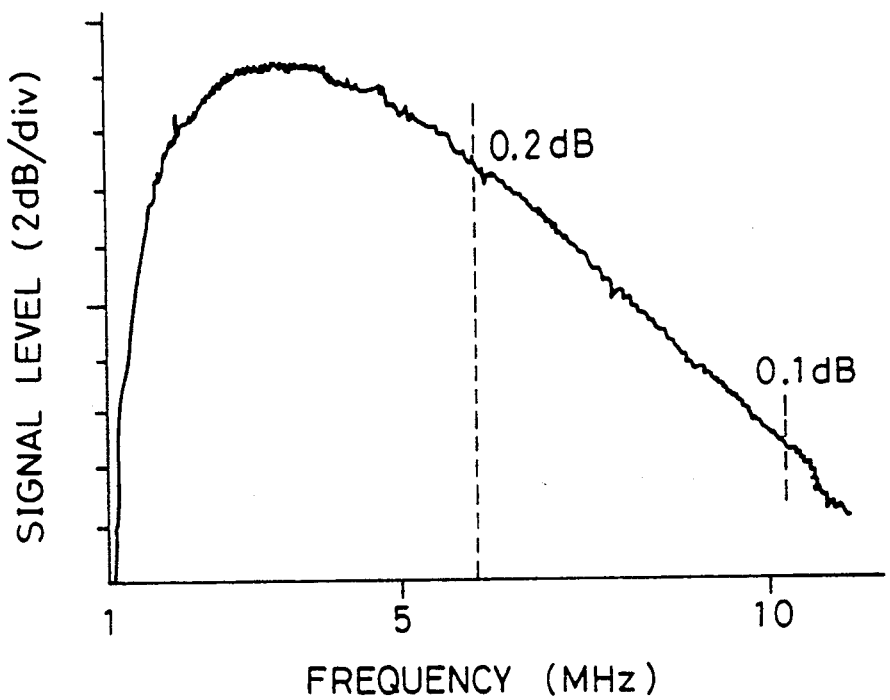
FIG. 3 is a curve illustrating reproduced signal characteristics of the magnetic head shown in FIGS. 1 and 2.

In order to examine the frequency characteristics of reproduced signals of each of the magnetic heads produced as described above, constant current recording of signals whose frequency was from 1 to 12 MHz to an alloy type disc was performed and then reproduction from the disc was performed using the above-described metal-in-gap head. FIG. 3 is a graph representing a curve which illustrates an example of frequency characteristics of reproduced signals. The results of the test confirmed that in the case of the magnetic head provided with a reaction prevention film 3 made of an FeNiNb type alloy film having a thickness of 0.5 $\mu$m, it was able to decrease the size of contour to a level of 0.2 dB or less, and that the magnetic head had good reproduced signal characteristics.

Figure 4:
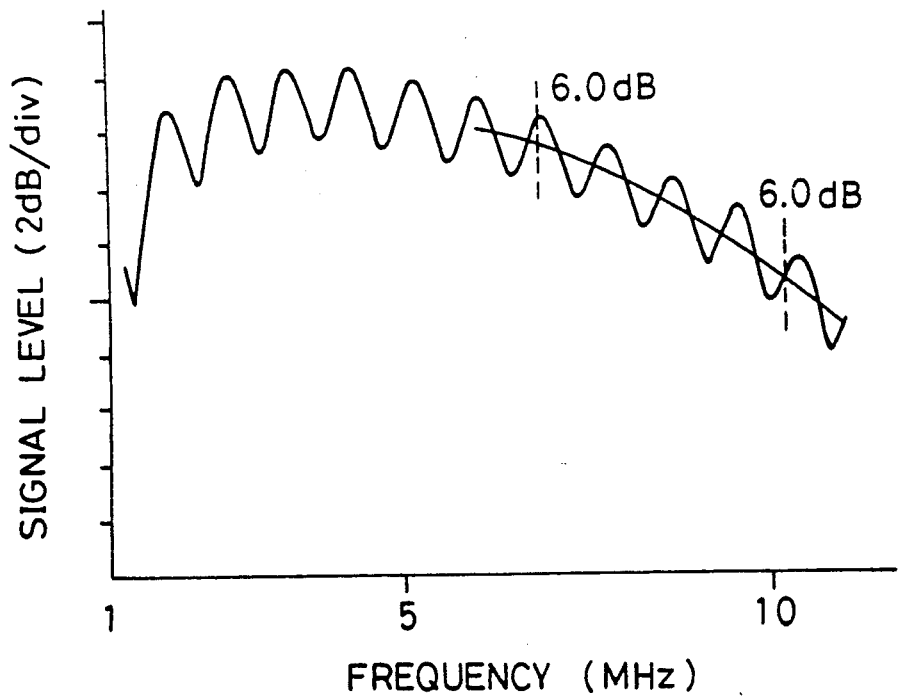
FIG. 4 is a curve illustrating reproduced signal characteristics of a magnetic head having no reaction prevention film in comparison with the magnetic head illustrated in FIG. 3.

For comparison, a metal-in-gap type magnetic head was fabricated in the same manner as in the above-described embodiment except that the reaction prevention film 3 was omitted, and this comparative magnetic head was examined for its reproduced signal characteristics. FIG. 4 illustrates the results of the test which indicated that the width of swell reached a value of from 5 to 7 dB.

From this, it can be understood that the magnetic head for both recording and reproduction according to this embodiment having the following two advantageous points can be obtained by the provision of an FeNiNb type alloy film as the reaction prevention film 3 between the magnetic oxide 2 and the magnetic metal film 1 and by arrangement of a part of interface between the magnetic oxide 2 and the magnetic metal film 1 near the magnetic gap portion g, the interface being substantially parallel to the magnetic gap portion g. First advantageous point of the above-described magnetic head is that reproduction characteristics of the magnetic head is not deteriorated even after heat treatment such as weld of glass. Second advantageous point is that the magnetic head has good characteristics upon both recording and reproduction.

Hence, it is possible to produce magnetic heads which have a very simple construction such that the surfaces on which films are formed are parallel to the junction portion serving as a magnetic gap portion, in contrast to conventional magnetic heads in which an azimuth angle is provided so that the junction portion functioning as a false gap and the true magnetic gap portion are non-parallel to each other, and in addition it is possible to provide magnetic heads at low cost according to the present invention.

While in the above-described embodiment, both of the two magnetic core halves are made of a magnetic oxide and a magnetic metal film, it is possible to use only one magnetic core half made of a magnetic oxide and a magnetic metal film and replace another magnetic core half by the one which as a different construction therefrom.

Next, the reason why the thickness of the reaction prevention film 3 made of an FeNiNb type alloy film was set up to a value in a range of from 0.05 to 2 $\mu$m in the metal-in-gap type magnetic head according to the above-described embodiment was explained concretely by way of test examples below.

TEST EXAMPLE 1

At first, the reaction prevention film 3 was formed in a thickness of no greater than 0.05 $\mu$m. In this case, during the step of weld of glass and subsequent steps, the occurrence of a reaction prevention film which has deteriorated soft magnetic characteristics was obtained on an interface between the ferrite 2, which is a ferromagnetic oxide, and the reaction prevention film 3. Hence, it is considered that if the thickness is no greater than 0.05 μm, the FeNiNb type alloy film does not function sufficiently as a reaction prevention film.

TEST EXAMPLE 2

Wear tests for 1,000 hour running were carried out using a plurality of metal-in-gap type magnetic heads having the reaction prevention films 3 made of FeNiNb type alloy films of various thicknesses in a range of from 0.05 to 5 μm. As a result, in comparison with a magnetic head having no reaction prevention film 3, uneven wear was observed when the reaction prevention film 3 made of an FeNiNb type alloy film had a thickness of no smaller than 2 μm, and the amount of wear of the metal-in-gap type magnetic head having the construction according to the above-described embodiment increased. On the other hand, when the thickness of the reaction prevention film 3 was from 1 to 2 μm, uneven wear was observed slightly but the amount of wear of the metal-in-gap type magnetic head having the construction according to the above-described embodiment was equal to that of the magnetic head of the construction according to the above-described embodiment with a film thickness of no smaller than 2 μm. When the reaction prevention film 3 had a thickness of no greater than 1 μm, the metal-in-gap type magnetic head gave an amount of wear equal to that of the above-described embodiment with a film thickness of no smaller than 2 μm and no uneven wear was observed.

From the results of Test Examples 1 and 2, it is found that the thickness of the reaction prevention film 3 made of an FeNiNb type alloy film in the metal-in-gap type magnetic head having the above-described construction according to the present invention is in a range of preferably from 0.05 to 2 μm, and more preferably from 0.1 to 1 μm.

Next, it is necessary to limit the scope of the composition of film 3 which can be accepted as a reaction prevention film for metal-in-gap type magnetic heads because the reaction prevention film 3 itself will function as a false magnetic gap portion unless the reaction prevention film 3 having a thickness in the above-described range has soft magnetic characteristics to a certain extent. Accordingly, the reaction prevention film 3 preferably has a composition represented by a composition formula: $Fe_aNi_bNb_c$ wherein a, b and c are percentage compositions of respective components on percent (%) by weight basis, and satisfy the following relationships:

$$5 \leq a \leq 29,$$

$$70 \leq b \leq 85,$$

$$1 \leq c \leq 15,$$

and $$a+b+c=100$$

In the composition formula above, the range of $70 \leq b \leq 85$ is a range where the magnetic permeability μ is extremely high and coercive force Hc is weak, thus exhibiting good characteristics. Saturated magnetic flux density Bs depends almost on Fe and therefore Bs will deteriorate in a range of $c>15$ or $a<5$. The range of $c<1$ is considered inappropriate because in this range interface reaction occurs between the reaction prevention film and the ferromagnetic oxide, and the diffusion of Ni was observed upon observation using SEM (scanning type electron microscope). From the above-described reasons, the scope of the composition formula represented by the composition formula described above is believed to be the best. Furthermore, in order to increase hardness, improve bonding of grain boundary, make crystals finer or achieve other functions, one or more additional elements such as Si, Ti, Cr, Mn, Co, Mn, Ta, W and the like may be added to the composition represented by the above-described composition formula so far as the amount thereof is limited to a trace amount.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A magnetic head comprising:
   a first core half and a second core half, respectively made of a magnetic oxide and having first and second opposite surfaces being opposite to each other,
   an FeNiNb type alloy film arranged on at least one of said first and second opposite surfaces of said first and second core halves,
   a first magnetic metal film and a second magnetic metal film arranged on said first and second opposite surfaces including said FeNiNb type alloy film which is arranged on at least one of said first and second opposite surfaces,
   a magnetic gap portion formed on at least a portion of a space defined between said first and second magnetic metal films, wherein a portion of said FeNiNb alloy film near said magnetic gap portion is substantially parallel to said magnetic gap portion.

2. A magnetic head as claimed in claim 1, wherein said FeNiNb type alloy film is a film having soft magnetic characteristics represented by a composition formula: $Fe_aNi_bNb_c$ where a, b and c are percentage compositions of respective components on percent (%) by weight basis, and satisfy the following relationships:

$$5 \leq a \leq 29,$$

$$70 \leq b \leq 85,$$

$$1 \leq c \leq 15,$$

and $$a+b+c=100$$

3. A magnetic head as claimed in claim 1, wherein said FeNiNb type alloy film has a thickness in a range of from 0.05 to 2 μm.

4. A magnetic head as claimed in claim 1, wherein at least one of said first and second core halves is composed of a ferromagnetic oxide.

5. A magnetic head as claimed in claim 4, wherein said ferromagnetic oxide is an Mn-Zn type ferrite.

6. A magnetic head as claimed in claim 1, wherein said magnetic metal film is made of an alloy having soft magnetic characteristics.

7. A magnetic head as claimed in claim 6, wherein said alloy having soft magnetic characteristics is a Sendust type alloy.

8. A magnetic head as claimed in claim 1, wherein said magnetic gap portion comprises a first magnetic gap element and a second magnetic gap element, at least a portion of each of said first and second gap elements having a portion being substantially parallel to each other.

9. A magnetic head as claimed in claim 8, wherein said first and second magnetic gap elements are composed of silicon dioxide.

* * * * *